(12) United States Patent
Herrmann et al.

(10) Patent No.: US 10,886,576 B2
(45) Date of Patent: Jan. 5, 2021

(54) ELECTRIC VEHICLE BATTERY CELL WITH SENSE TABS

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Wolfsburg (DE)

(73) Assignees: VOLKSWAGEN AG, Wolfsburg (DE); AUDI AG, Ingolstadt (DE); Dr. ING. H.C.F. PORSCHE AG, Stuttgart (DE)

( * ) Notice: Subject to any disclaimer, the term of this patent is extended or adjusted under 35 U.S.C. 154(b) by 250 days.

(21) Appl. No.: 15/951,664

(22) Filed: Apr. 12, 2018

(65) Prior Publication Data
US 2019/0319314 A1 Oct. 17, 2019

(51) Int. Cl.
H01M 10/42 (2006.01)
H01M 10/44 (2006.01)
H01M 10/48 (2006.01)

(52) U.S. Cl.
CPC ....... H01M 10/441 (2013.01); H01M 10/425 (2013.01); H01M 10/482 (2013.01); *H01M 2010/4271* (2013.01); *H01M 2220/20* (2013.01)

(58) Field of Classification Search
None
See application file for complete search history.

(56) References Cited

U.S. PATENT DOCUMENTS 9,182,448 B2 * 11/2015 Tanabe ................ H01M 10/482

FOREIGN PATENT DOCUMENTS

EP 1 422 769 B1 7/2007
EP 1 487 034 B1 3/2012

OTHER PUBLICATIONS

U.S. Appl. No. 15/432,401, filed Feb. 14, 2017, 16 pages.

* cited by examiner

*Primary Examiner* — Tracy M Dove
(74) *Attorney, Agent, or Firm* — Davidson, Davidson & Kappel, LLC (57) ABSTRACT

A battery includes a first battery cell including an endplate current collector cathode, an endplate current collector anode, a plurality of battery cell components between the endplate current collector cathode and the endplate current collector anode, each battery cell component including a cathode, a separator, an anode and a bipolar current collector, and at least one sense tab connected to and extending from one of the bipolar current collectors between the endplate current collector cathode and the endplate current collector anode. A second battery cell is connected in parallel to the first battery cell via the endplate current collector cathode and the endplate current collector anode. A voltmeter is connected between a first sense tab and one of the following: the endplate current collector cathode, endplate current collector anode or a second sense tab of the at least one sense tabs, the voltmeter being electrically isolated from at least one of the endplate current collector cathodes and the endplate current collector anodes via at least one battery cell component of the first battery cell and measuring at least two of the battery cell components. A battery cell, a method, an electric vehicle battery and an electric vehicle are also provided.

20 Claims, 8 Drawing Sheets

Prior Art

Prior Art

ELECTRIC VEHICLE BATTERY CELL WITH SENSE TABS

FIELD OF THE INVENTION

The present invention relates generally to electric vehicles and more particularly to batteries for electric or hybrid vehicles.

BACKGROUND

European Patent EP 1 487 034 B1 discloses a battery of a bipolar structure with the detection tabs. As disclosed in the patent, if unevenness occurs in voltage between respective unit cell layers, a probability arises wherein one unit cell layer results in an overcharging state and the other unit cell layer results in an over-discharging state with a resultant difficulty in achieving stable use. By utilizing the detection tabs, as voltage detection tabs for detecting the terminal voltage of each unit cell layer, which is connected to an appropriate external control circuit (such as a voltage detection circuit or an electric current bypass circuit) through leads in use, the voltage for each unit cell layer can be monitored. Additionally, letting charging current or discharging current of the unit cell layer, whose abnormal voltage (voltage deviated from a rated range) is detected, to flow through a bypass circuit enables the occurrence of overcharging and over-discharging phases to be effectively eliminated. This results in suppression of the overcharging and over-discharging statuses as a result of an unevenness occurring in voltage between the unit cell layers caused by the unit cell layers being serially connected inside the battery, enabling the bipolar battery to be stably and safely used for a long period.

European Patent EP 1487 034 B1 also states that it is preferable for the detection tabs located for each unit cell layer to detect the presence of the unit cell layer bearing abnormality for thereby permitting charging or discharging current to bypass. This is effective for the entire unit cells or the whole battery to have a voltage value from which voltage drop merely occurs by a level equivalent to a voltage component of the unit cell encountered with abnormality. Thus, with the battery applied to a vehicle as a drive power source, even when abnormality occurs in the battery during running of the vehicle, no probability occurs for the battery to rapidly shut down the supply of electric power to enable the vehicle to continuously run in a safety mode and it becomes possible to keep the power supply at a rate sufficient for clearing the vehicle out of a travel lane to an evacuation site such as road shoulders, enabling the vehicle to have a further enhanced safety.

European Patent EP 1 422 769 B1 discloses a stack type battery with unit cell voltage measurement tabs. As stated in the patent, the stack type battery allows respective unit cells to share voltages to provide a ratio of (charging voltage)/(the number of unit cells connected in series). However, in actual practice, variation occurs in internal resistance and capacity for the unit cell and, therefore, fluctuation takes place in the voltages shared by the respective unit cells. As a result, deterioration proceeds from the unit cell whose shared voltage is high and it is conceivable that a life cycle of the stack type battery tends to be limited by the unit cell having such a high shared voltage. To cope with such a phenomenon, it is, according to the patent, required to construct to compel the voltages shared by respective unit cells to be controlled so as to allow all the unit cells to uniformly share the voltages and thus there is a need for preparing electrodes for measuring the voltages of the unit cells one by one.

European Patent EP 1 422 769 B1 patent also discloses that shared voltage measurement tab electrodes are disposed at deviated positions on a side surface of the stack type battery in a direction intersecting the stack direction. A unit cell controller unit connected to the bipolar battery has current bypass circuits connected in parallel to the respective unit cells of the bipolar battery. As charging proceeds, a voltage across terminals of the unit cells increases and if such a voltage exceeds a Zener voltage, a Zener diode of the current bypass circuit conducts to bypass current flowing through the unit cell. When using the Zener diode whose Zener voltage is 4.0 volts, charging of the unit cell is terminated at a timing at which the voltage across the terminals falls in 4.0 volts. The unit cell whose voltage across the terminals reaches the charging voltage automatically terminates its charging mode and, at a timing at which all the current bypass circuits bypass the unit cells, charging of the bipolar battery is terminated. A plurality of cell units can be provided with shared voltage measurement tab electrodes connected in parallel through shared voltage measurement tab electrodes.

Japanese Patent Publication JP 2011 082097 describes a laminated battery in which voltage detection tabs are provided protruding from a stacked body having a plurality of unit cell elements. A voltage takeout board connected to the voltage detection tabs is provided at the projecting position of the voltage detection tabs. Correspondingly, the wiring of the voltage takeout board is positioned, the voltage detection tab protrudes from the single cell element so as not to overlap with each other in the stacking direction of the stacked body. The battery purportedly is capable of detecting a voltage of each unit cell in a battery and adjusting a capacity thereof.

SUMMARY OF THE INVENTION

The present invention provides a battery comprising: a first battery cell including an endplate current collector cathode, an endplate current collector anode, a plurality of battery cell components between the endplate current collector cathode and the endplate current collector anode, each battery cell component including a cathode, a separator, an anode and a bipolar current collector, and at least one sense tab connected to and extending from one of the bipolar current collectors between the endplate current collector cathode and the endplate current collector anode; a second battery cell connected in parallel to the first battery cell via the endplate current collector cathode and the endplate current collector anode; and a voltmeter connected between a first sense tab of the at least one sense tab and one of the following: the endplate current collector cathode, endplate current collector anode or a second sense tab of the at least one sense tabs, the voltmeter being electrically isolated from at least one of the endplate current collector cathodes and the endplate current collector anodes via at least one battery cell component of the first battery cell and measuring at least two of the battery cell components.

By providing the electrical isolation of the voltmeter, monitoring of individual battery cells with a small number of voltmeters is possible, and individual monitoring of battery cell components is dispensed with. Costs and packaging or housing issues related to sense tabs can be reduced as well.

A second voltmeter can be connected between the first sense tab, the second sense tab or a further sense tab of the at least one sense tab and one of the following: the endplate current collector cathode and the endplate current collector anode. This provides for better identification of where issues within the battery cell may have arisen.

The first voltmeter can be connected between the first sense tab and the second sense tab, and second voltmeter can be connected between the second sense tab and the endplate current collector cathode and the endplate current collector anode.

Alternately, the first voltmeter can be connected between the first sense tab and the second sense tab, and second voltmeter can be connected between the further sense tab and the endplate current collector cathode and the endplate current collector anode.

The second sense tab and the further sense tab can be spaced apart by at least the cathode, the separator and the bipolar current collector of one of the battery cell components.

Each voltmeter preferably monitors at least 25 and more preferably at least 50 battery cell components.

The number of battery cell components for each of the first and second battery cells preferably is at least 50 and more preferably at least 100.

Preferably, at least 50 battery cells are connected in parallel via the endplate current collector cathode and the endplate current collector anode.

The first and second battery cells preferably have a voltage of at least 420 volts.

The present invention also provides a battery cell comprising: an endplate current collector cathode; an endplate current collector anode; at least 50 battery cell components between the endplate current collector cathode and the endplate current collector anode, each battery cell component including a cathode, a separator, an anode and a bipolar current collector; and ten or fewer sense tabs connected to and extending from one of the bipolar current collectors between the endplate current collector cathode and the endplate current collector anode.

By having a reduced amount of sense tabs per battery cell components, less than 20%, the costs and issues associated with sense tabs for each battery cell component are significantly reduced, while still permitting general monitoring of the battery cell.

Preferably, five or fewer sense tabs are provided, and more preferably exactly two sense tabs are provided for the battery cell or exactly one sense tab is provided for the battery cell.

The present invention also provides for monitoring the battery disclosed above during charging or operation.

The present invention is most preferably used with an electric vehicle battery comprising the battery above, and with an electric vehicle comprising the electric vehicle battery recited above.

BRIEF DESCRIPTION OF THE DRAWINGS

The following describe several nonlimiting embodiments of the present invention, in which.

DETAILED DESCRIPTION OF THE PREFERRED EMBODIMENTS

Figure 1:
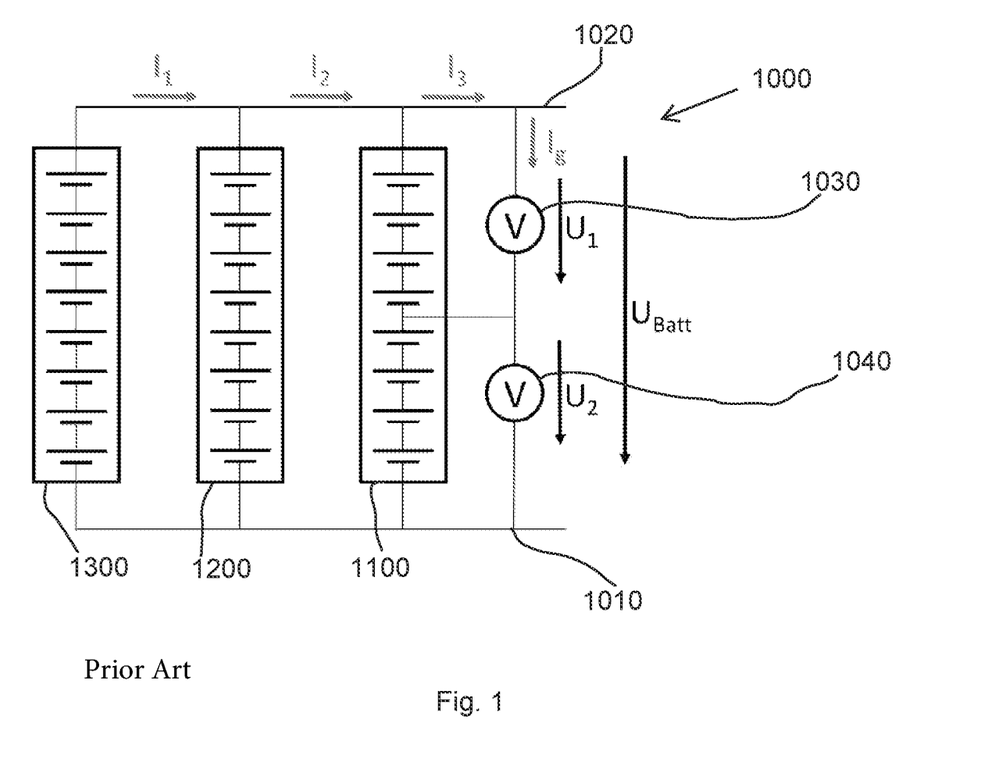
FIG. 1 shows a schematic of a battery not according to the invention.

FIG. 1 shows a schematic of a battery 1000 not according to the invention, used to explain the present invention. Battery 1000 has three battery cells 1100, 1200, 1300 connected in parallel between an anode line 1010 and a cathode line 1020. The voltage of the battery Ubat is thus the voltage between these two lines, and the battery cells 1100, 1200, 1300 add current as shown so that a final current Ig is provided by the battery 1000.

If voltmeters 1030, 1040 are used to measure the voltage of cell 1100, the voltmeters 1030, 1040 still receive current from cells 1200 and 1300. Thus even if a cell 1100 is out of order, a battery management system (BMS) receiving information from the voltmeters 1030, 1040 will believe that cell 1100 is functioning correctly.

Figure 2:
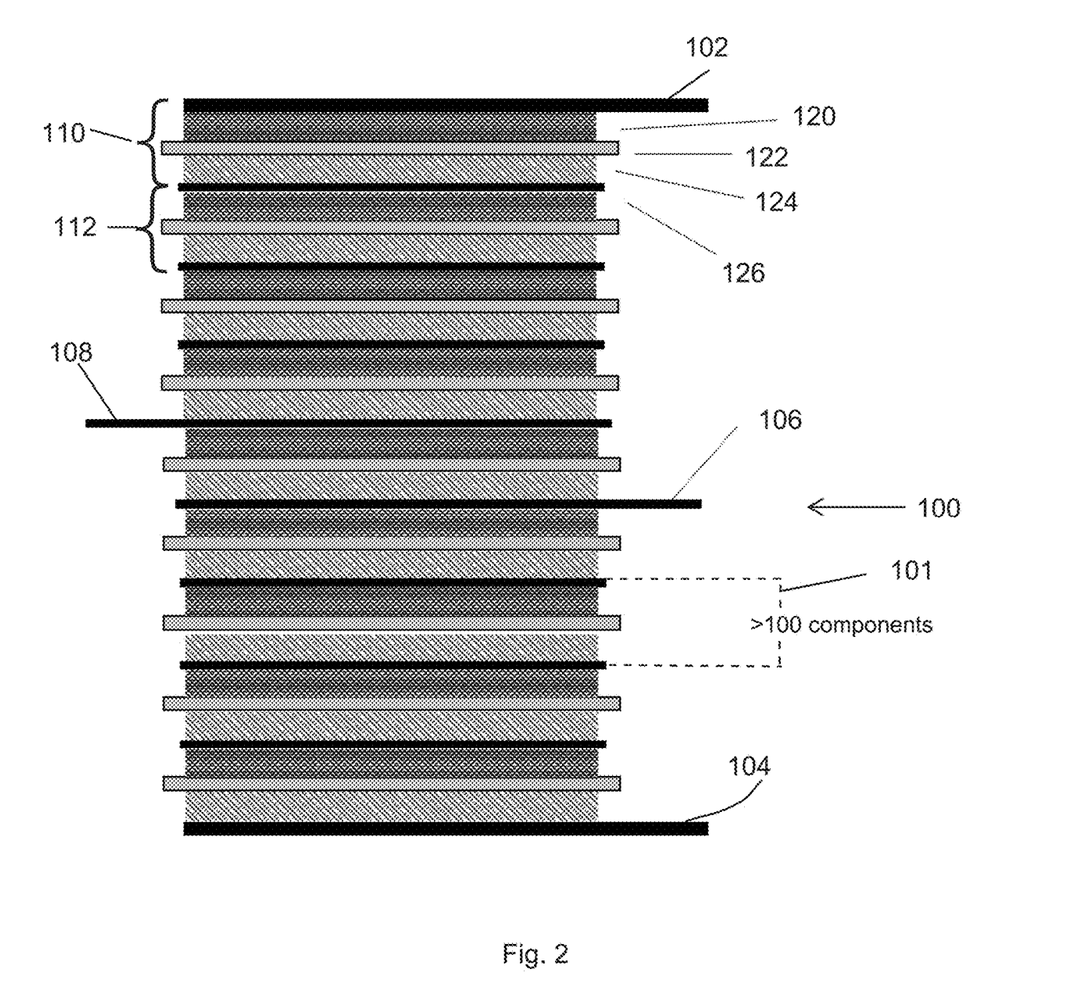
FIG. 2 shows a side schematic view of a battery cell of the present invention.

FIG. 2 shows a side schematic view of a battery cell 100 of the present invention. Battery cell 100 has an endplate current collector cathode 102, and endplate current collector anode 104, and a plurality of battery cell components 110, 112 between endplate current collector cathode 102 and endplate current collector anode 104. Each battery cell component 110, 112 includes a cathode 120, a separator 122, an anode 124 and a bipolar current collector 126. Sense tabs 106 and 108 can be connected to and extending from one of bipolar current collectors 126 between endplate current collector cathode 102 and endplate current collector anode 104.

Bipolar current collector 126 can be made of copper or aluminum or nickel-coated aluminum or nickel for example, and the sense tabs 106, 108 can made from the same material and may be integral with the bipolar current collector 126. Preferably, the bipolar current collector 126 and sense tabs 106, 108 are made of a thin foil of aluminum coated with nickel.

Separator 122 can be a dielectric material, for example a porous polyethylene or polyethylene-polypropylene foil (typically 8 to 25 μm thickness). Anode 124 and cathode 120 can be deposited for example by vapor deposition or other film technology on separator 122.

The battery may incorporate a polymer frame as disclosed in U.S. patent application Ser. No. 15/432,401, filed Feb. 14, 2017, hereby incorporated by reference herein, and typical electrolytes such as liquids or gels may be used. However, the present invention also can incorporate solid-state electrolytes such as lithium oxide or sulfide glasses or glass ceramics or ceramics as electrolytes.

Each battery cell component 110, 112 typically will have a voltage of 4.2V, and each battery cell may be of high voltage, defined herein greater than 200V. Battery cell 100 thus typically will have 50 battery cell components or more, and preferably 100 battery cell components or more. In one embodiment 200 battery cell components are provided for each battery cell 100, shown schematically by line 101, so that a voltage around 800V is provided. This is the case for the battery cells shown in each of the figures schematically.

A battery pack for a vehicle can have more than 50 of the high voltage battery cells in parallel, for example 70 battery cells 100.

Figure 3A:
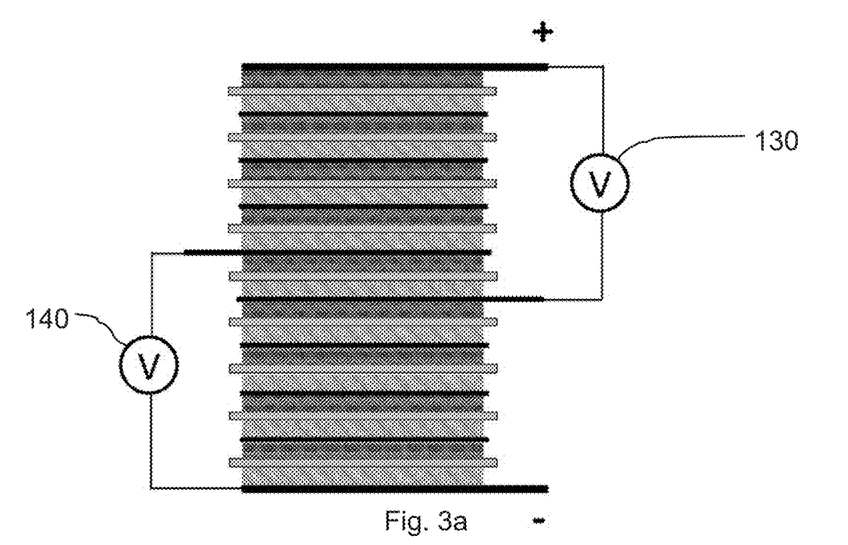
FIGS. 3a and 3b show schematically battery cell of FIG. 2 connected to voltmeters.
Figure 3B:
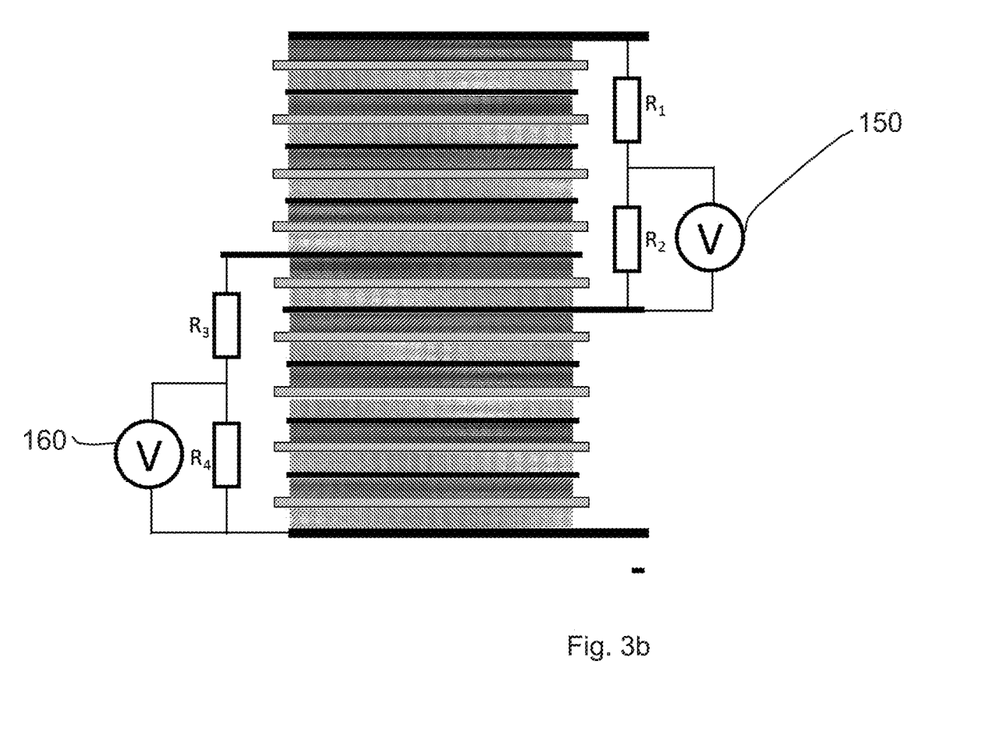

FIG. 3a shows schematically battery cell 100 of FIG. 2 connected to voltmeters 130, 140. Voltmeter 130 can measure for example a large number of battery cell components, here shown schematically as 5.3b Voltmeters 150, 160 show further monitoring possibilities with resistors R1, R2 and R3 and R4 being provided as shown.

Figure 4:
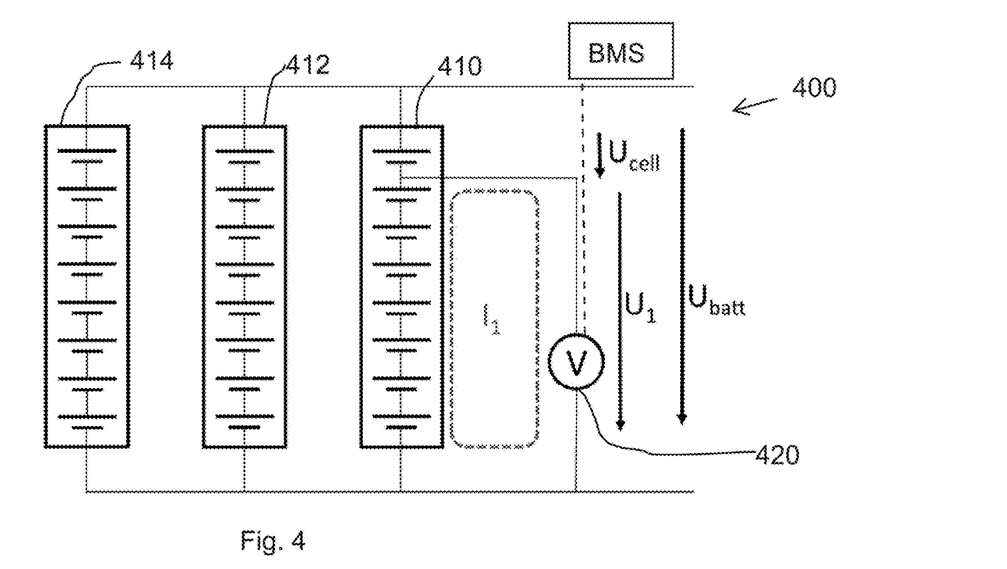
FIG. 4 shows a schematic of a first embodiment of a battery according to the present invention.

FIG. 4 shows a schematic of a first embodiment of a battery 400 according to the present invention, having battery cells 410, 412 and 414. The cells can be simply connected in parallel via their respective endplate current collector cathodes 102, and endplate current collector anodes 104, respectively. Each battery cell component 110, 112 has a battery cell component voltage Ucell, typically around 4.2V. Cell 410, with for example 50 or more battery cell components, can have a single sense tab, making manufacture easier and potential leakage or contamination into a sealed housing more difficult.

A battery management system (BMS) with voltmeter 420 can monitor U1, which can be Ubatt-Ucell. Since the voltmeter 420 is not connected to battery cells 412 and 414 in parallel, should a battery component within the voltmeter 420 measurement area fail or malfunction, for example during operation or charging, the voltmeter 420 will register a change indicating a failure or issue with battery cell 410 within the voltmeter measurement area. Also, if the top battery component malfunctions and the BMS is monitoring Ubatt, an issue with the top cell component can be identified, For example if the top cell component in FIG. 4 short circuits, U1 will increase to Ubatt, indicating a short circuit in the top cell component. For example if there are 150 cell components providing 4 volts each, the Ubatt will be 600V, and U1 596V during normal operation. However a short circuit in the top cell component will then provide the voltage of battery cells 412, 414 with similar construction to the voltmeter 420, which will indicate a voltage of 600V.

Battery cells 412, 414 can be provided similar voltmeters and monitoring by the BMS. As opposed to the prior art, where sense tabs are required for every cell component and each cell component is individually monitored, the present invention provides for a less expensive, reliable way to monitor battery cell charging and operation, and to identify malfunctions and failures more easily. For example, if 70 battery cells of 200 cell components each are used in a vehicle battery, 14000 sense tabs and voltmeters and the respective monitoring function of the BMS would be needed. While this provides more accuracy, it is impractical from a cost and manufacturing standpoint. Also, each sense tab, if used with liquid or gel electrolyte, represents a potential leakage point. The present invention permits 70 sense tabs for use with the embodiment of FIGS. 4, and 140 for the embodiments below, while still permitting identification of the malfunctioning battery cell.

The malfunctioning battery cell also can then be bypassed to permit continued operation until servicing.

Figure 5:
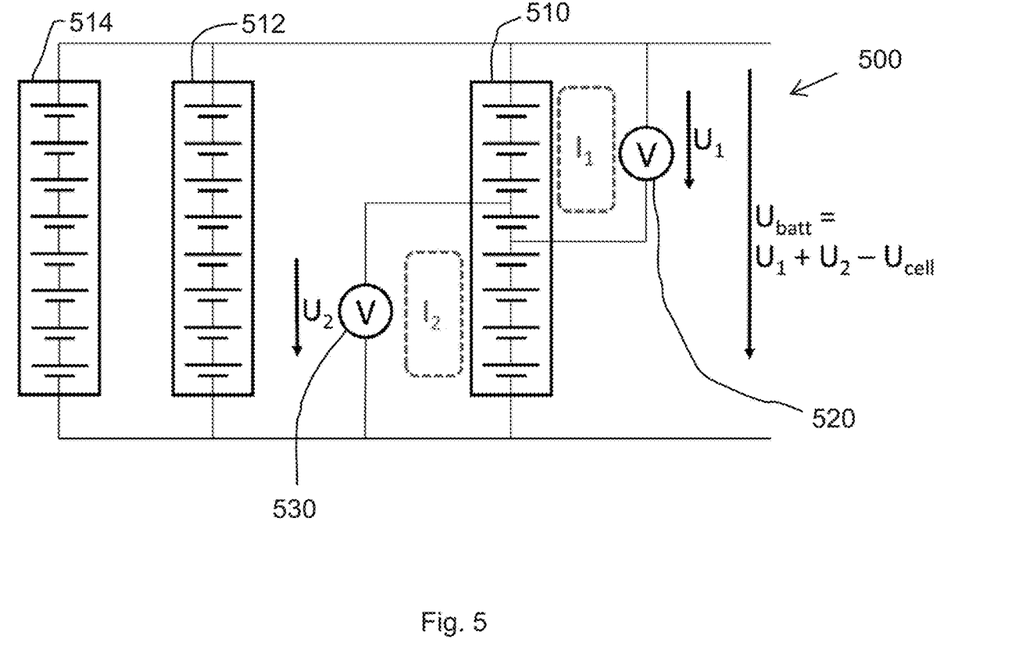
FIG. 5 shows a schematic of a second embodiment of a battery according to the present invention.

FIG. 5 shows a schematic of a second embodiment of a battery 500 according to the present invention. To allow for more precise identification of an issue, two sense tabs can be provided for a battery cell 510, 512, 514, and two voltmeters can be provided for each battery cell 510, 512, 514. In a battery cell with 200 battery cell components, voltmeter 520 for example can monitor the first 110 battery cell components for a voltage U1, and voltmeter 530 the last 91 battery cell component for a voltage U2, overlapping one battery cell component. The part of the battery cell 510 monitored by each voltmeter that malfunctions can be identified, for example by comparing the results from the voltmeters with other battery cells 512, 514 or from stored data such as previous readings of U1 or U2. Even if the overlapped battery cell component malfunctions, the voltage drop for each of the U1 and U2 can be identified by the BMS.

Figure 6:
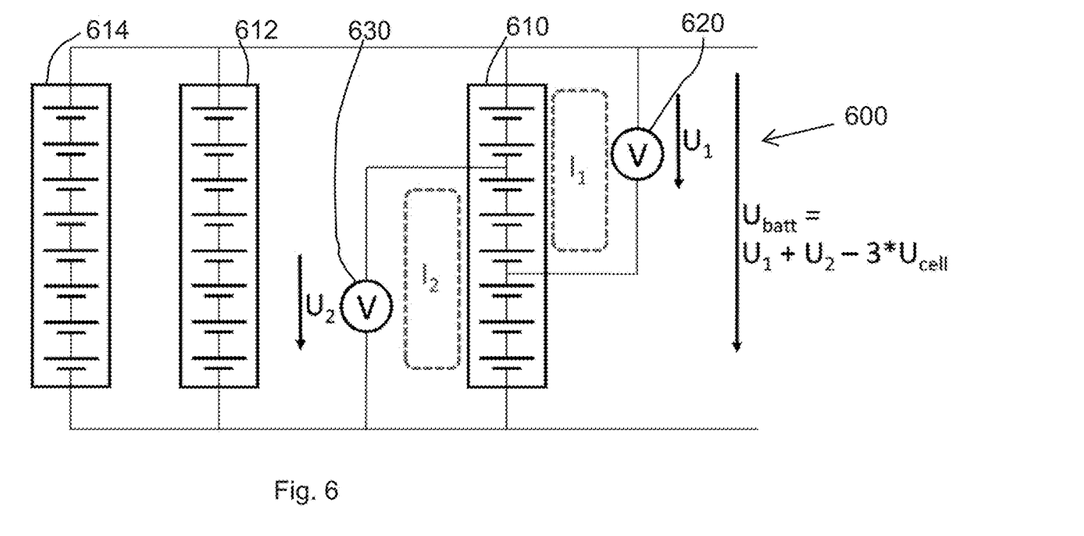
FIG. 6 shows a schematic of a third embodiment of a battery according to the present invention.

FIG. 6 shows a schematic of a third embodiment of a battery 600 according to the present invention in which three battery cell components of battery cell 610 are overlapped by voltmeters 620, 630. Malfunctions within the battery component areas measured by the voltmeters 620, 630 can be monitored by the BMS. FIG. 6 is provided to show that the number of overlapped components can be more than one, and these overlapped cells function as an isolator for the voltmeters.

Figure 7:
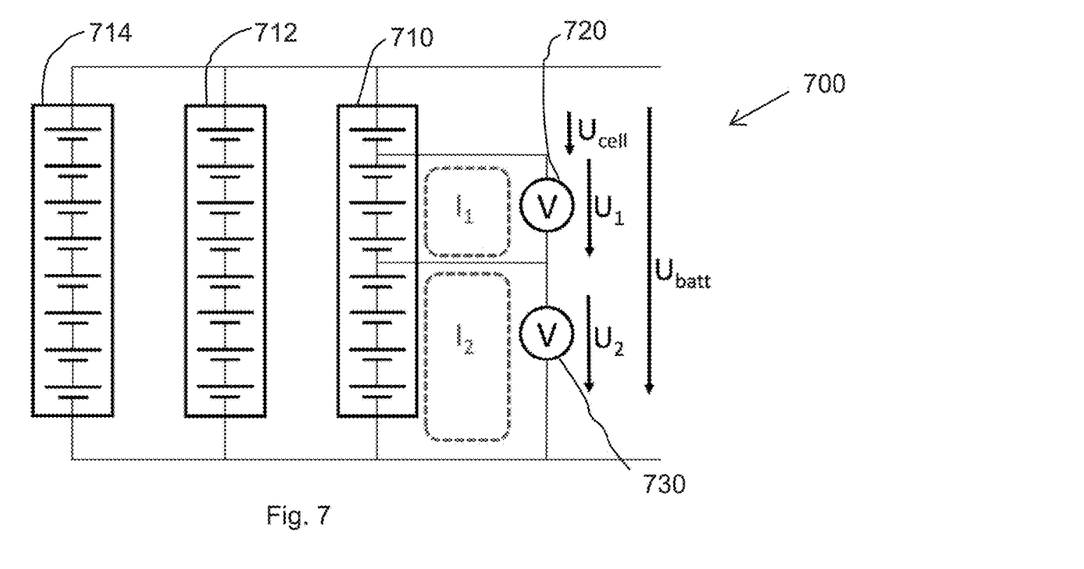
FIG. 7 shows a schematic of a fourth embodiment of a battery according to the present invention.

FIG. 7 shows a schematic of a fourth embodiment of a battery 700 according to the present invention, with battery cells 710, 712, 714. Here two voltmeters 720, 730 are provided without overlapping, but still permit identification of an issue within their specific measured region, with the top cell functioning as an isolator for voltmeters 720 and 730. The number of cells in this embodiment at the top could be more than one.

Figure 8:
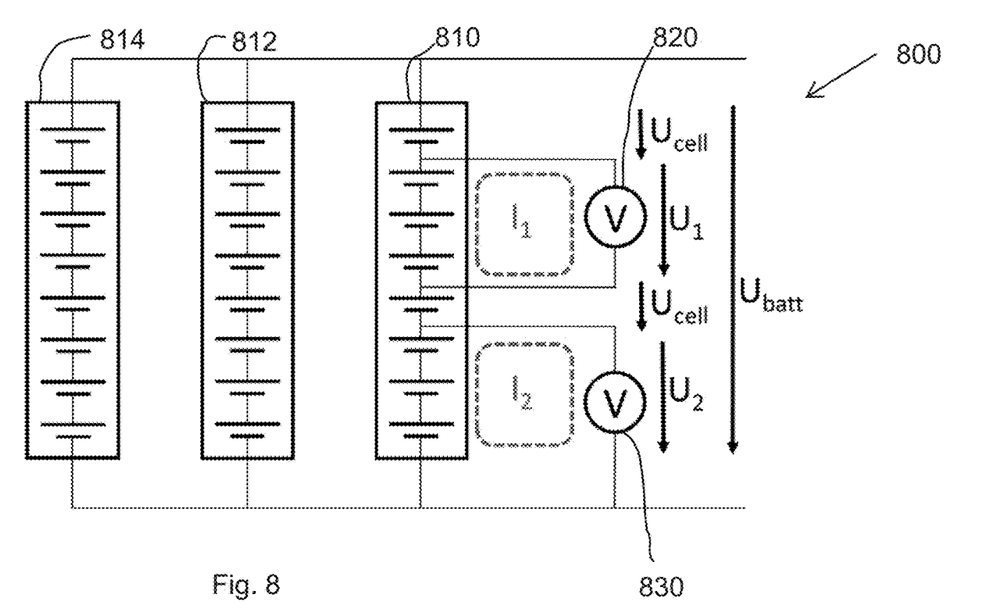
FIG. 8 shows a schematic of a fifth embodiment of a battery according to the present invention.

FIG. 8 shows yet a schematic of a fifth embodiment of a battery 800 according to the present invention in which voltmeter 820 measures some battery cell components and voltmeter 830 other battery cell components, their regions being separated by at least one battery cell component. Short circuit of the top battery cell component or the separating battery cell components in this case will not lead to U1+U2 being the same as U batt.

Figures 9A, 9B, 9C:
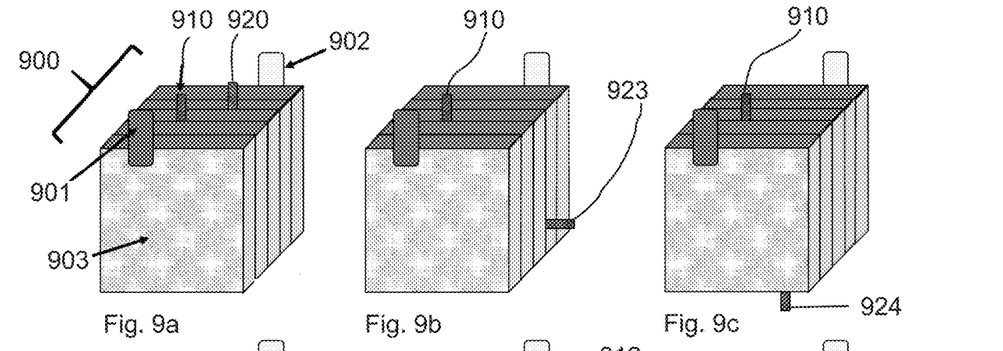
FIGS. 9a, 9b, 9c, 9d, 9e, 9f, 9g, 9h, and 9i show schematically various embodiments of battery cells of the present invention.
Figures 9D, 9E, 9F:
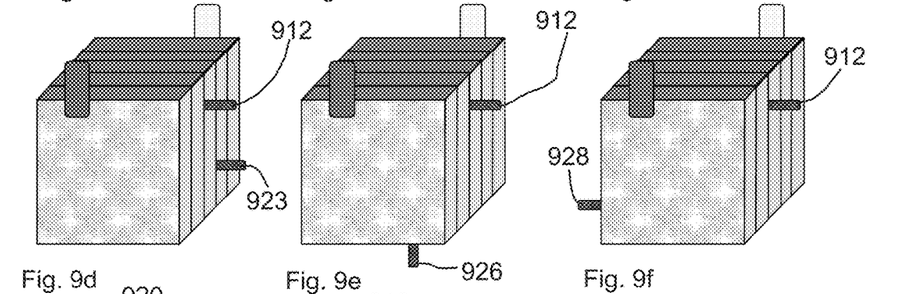
Figure 9G:
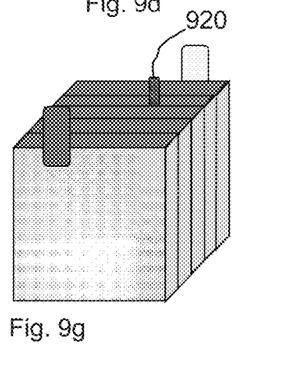
Figures 9H, 9I:
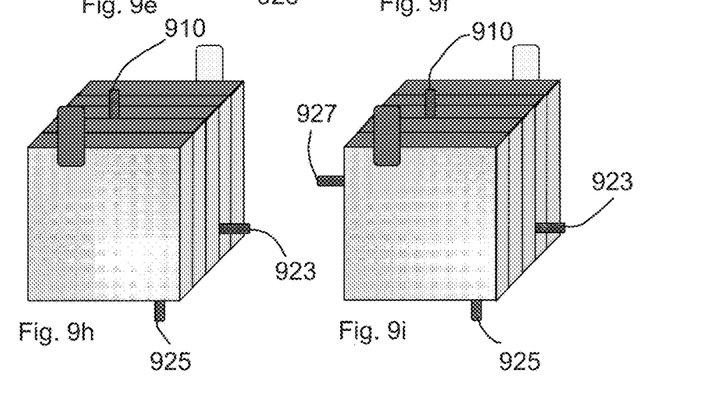

FIGS. 9a, 9b, 9c, 9d, 9e, 9f, 9g, 9h, and 9i show schematically various embodiment of battery cells of the present invention, with cathode tabs 902 connected to an endplate current collector cathode (not shown) and anode tabs 901 connected to endplate current collector anode 903. The sense tabs 910, 920 can be on a same side as the tabs 901, 902 as shown in FIG. 9a, or a sense tab 923 can be at 90 degrees, or a sense tab 924 on an opposite side at 180 degrees as shown in FIGS. 9b and 9c respectively. Alternately, both sense tabs 912, 923 can be on a side 90 degrees from the anode and cathode tabs as shown in FIG. 9d FIG. 9e shows tabs 912, 926, and FIG. 9f, opposing tabs 912 and 928. FIG. 9g shows a single sense tab 920, and FIG. 9h three sense tabs 910, 923, 925, with FIG. 9i showing a fourth sense tab 927.

Figure 10:
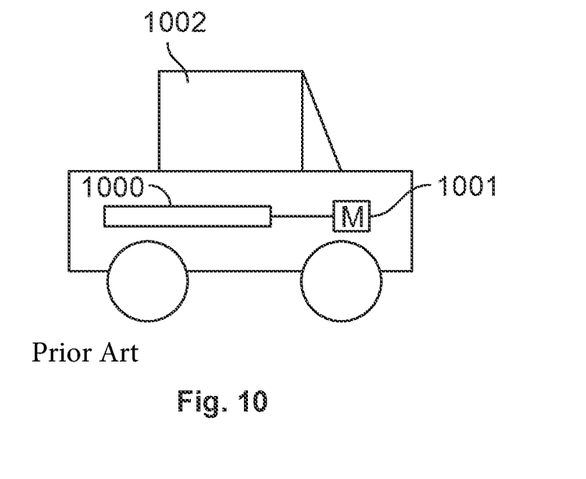
FIG. 10 shows schematically the battery of FIG. 1 in an electric or hybrid vehicle.

As shown schematically in FIG. 10, in one application, the battery 1000 can provide power as an electric battery to an electric motor 1001 for powering an electric or hybrid vehicle 1002.

What is claimed is:
1. A battery comprising:
a first battery cell including an endplate current collector cathode, an endplate current collector anode, a plurality of battery cell components between the endplate current collector cathode and the endplate current collector anode, each battery cell component including a cathode, a separator, an anode and a bipolar current collector, and at least one sense tab connected to and extending from one of the bipolar current collectors between the endplate current collector cathode and the endplate current collector anode;

a second battery cell connected in parallel to the first battery cell via the endplate current collector cathode and the endplate current collector anode;

a first voltmeter connected between a first sense tab of the at least one sense tab and one of the following: the endplate current collector cathode, the endplate current collector anode or a second sense tab of the at least one sense tab, the voltmeter being electrically isolated from at least one of the endplate current collector cathode or the endplate current collector anode via at least one battery cell component of the first battery cell and measuring at least two of the battery cell components.

2. The battery as recited in claim 1 further comprising a second voltmeter connected between the first sense tab, the second sense tab or a further sense tab of the at least one sense tab and one of the following: the endplate current collector cathode or the endplate current collector anode.

3. The battery as recited in claim 2 wherein the first voltmeter is connected between the first sense tab and the second sense tab, and the second voltmeter is connected between the second sense tab and the endplate current collector cathode or the endplate current collector anode.

4. The battery as recited in claim 2 wherein the first voltmeter is connected between the first sense tab and the second sense tab, and the second voltmeter is connected between the further sense tab and the endplate current collector cathode or the endplate current collector anode.

5. The battery as recited in claim 4 wherein the second sense tab and the further sense tab are spaced apart by at least the cathode, the separator and the bipolar current collector of one of the battery cell components.

6. The battery as recited in claim 1 wherein the first voltmeter monitors at least 25 battery cell components.

7. The battery as recited in claim 6 wherein the first voltmeter monitors at least 50 battery cell components.

8. The battery as recited in claim 1 wherein a number of battery cell components for each of the first and second battery cells is at least 25.

9. The battery as recited in claim 8 wherein the number of battery cell components for each of the first and second battery cells is at least 50.

10. The battery as recited in claim 8 further comprising at least 48 further battery cells connected in parallel to the first battery cell via the endplate current collector cathode and the endplate current collector anode.

11. The battery as recited in claim 1 wherein the first battery cell has a voltage of at least 210 volts.

12. A battery cell comprising:
an endplate current collector cathode;
an endplate current collector anode;
at least 25 battery cell components between the endplate current collector cathode and the endplate current collector anode, each battery cell component including a cathode, a separator, an anode and a bipolar current collector; and
ten or fewer sense tabs connected to and extending from one of the bipolar current collectors between the endplate current collector cathode and the endplate current collector anode.

13. The battery cell as recited in claim 12 wherein the number of battery cell components is at least 50.

14. The battery cell as recited in claim 12 wherein five or fewer sense tabs are provided.

15. The battery cell as recited in claim 14 wherein exactly two sense tabs are provided for the battery cell.

16. The battery cell as recited in claim 14 wherein exactly one sense tab is provided for the battery cell.

17. A method for monitoring the battery as recited in claim 1 comprising monitoring the first voltmeter during charging.

18. A method for monitoring the battery as recited in claim 1 comprising monitoring the first voltmeter during operation.

19. An electric vehicle battery comprising the battery as recited in claim 1.

20. An electric vehicle or hybrid vehicle comprising the electric vehicle battery as recited in claim 19.

* * * * *